(No Model.)
L. S. RIGGS.
AUTOMATIC CUT-IN VALVE FOR AIR BRAKES.
No. 453,505. Patented June 2, 1891.
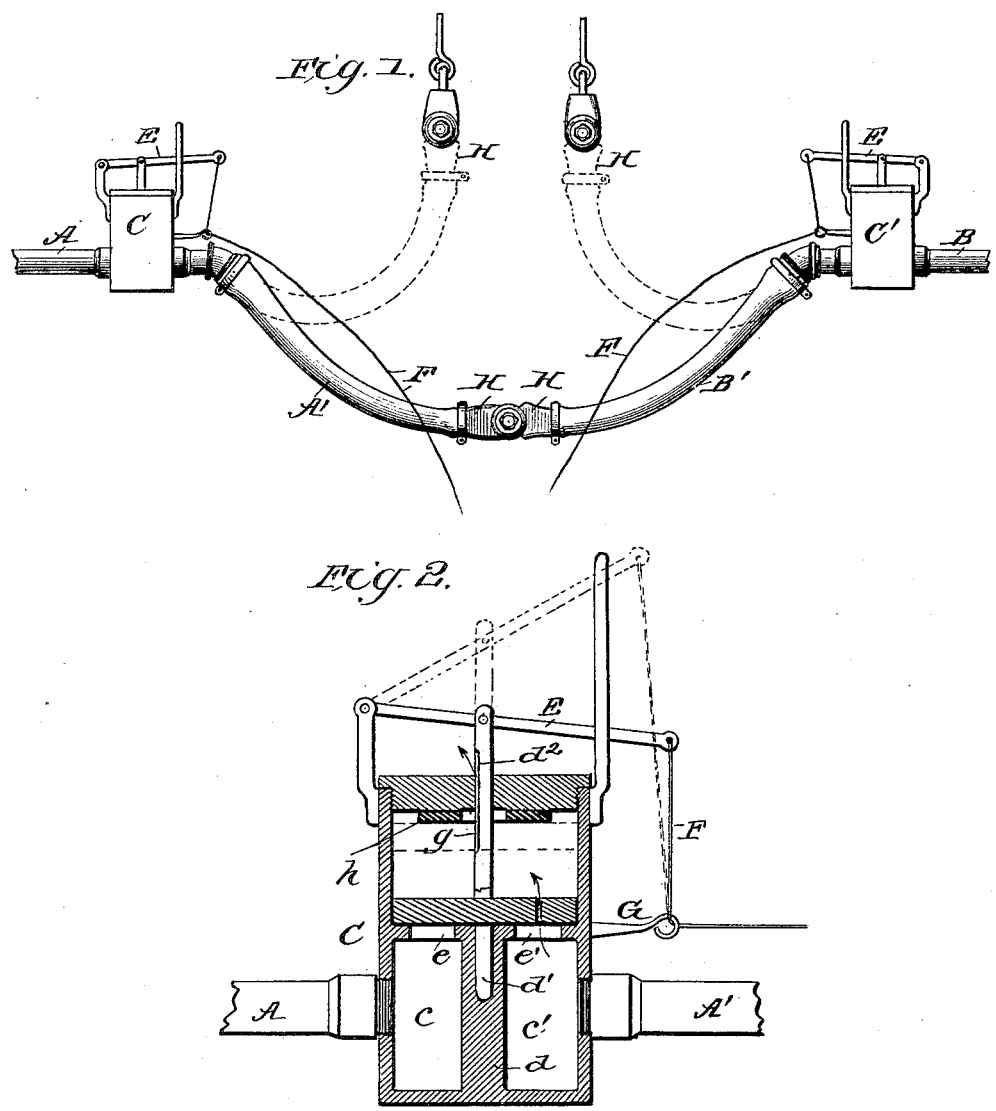

United States Patent Office.

LEWIS S. RIGGS, OF SELMA, ALABAMA.

AUTOMATIC CUT-IN VALVE FOR AIR-BRAKES.

SPECIFICATION forming part of Letters Patent No. 453,505, dated June 2, 1891.

Application filed December 9, 1890. Serial No. 374,108. (No model.)

*To all whom it may concern:*

Be it known that I, LEWIS S. RIGGS, of Selma, in the county of Dallas and State of Alabama, have invented a new and useful Improvement in Automatic Cut-in Valve for Air-Brakes, of which the following is a specification.

My invention relates to valves used in the compressed-air pipes under cars for applying and releasing the brakes; and it consists in the construction and arrangement of automatic valves used in connection with the couplings and blind-couplings, whereby all failures to open the air-valves after the couplings are made are avoided, as hereinafter fully described.

Figure 1 is a side view of the pipe-connections between cars, showing the valves in their positions in relation to the couplings; and Fig. 2 is an enlarged sectional view of one of the valves.

A and B are the sections of air-pipe which, between the cars, are connected by the flexible sections A' and B', the ends of which are provided with coupling-heads H H, of the ordinary construction.

C C' are the automatic valves, which are placed at the ends of the pipes A and B, where the flexible sections A' and B' join onto the same. Ordinarily plug-valves with cranks are employed at these points, which require to be turned off to retain the air before uncoupling the heads H H. The turning on of these plug-valves after the coupling is made again is necessary in order to permit the transmission of the pneumatic force through the line of pipes, and, as this turning on requires the thought or attention and involves an act of memory on the part of the brakeman, it has been found that in some cases these plug-valves are not turned on after the coupling is effected, and the line of pipe being left in this obstructed condition the brakes are rendered inoperative, involving great liability to accidents. My automatic valve is designed to obviate this act of memory on the part of the brakeman and render it impossible for the pipes to be left in an obstructed or inoperative condition. At the ends of the pipes A and B are arranged valve-casings C and C', the lower portion of each of which is divided into two chambers $c\ c'$, with parts $e\ e'$ in the top thereof, and whose upper portion is a single cylindrical chamber in which slides vertically a piston-valve D. This valve has a stem $d'$, that descends into a corresponding guide-hole in the middle partition $d$, and a stem $d^2$, which rises through the upper head of the casing and is jointed to a lever E. This lever is suitably fulcrumed upon a standard or offset upon one side, and is guided in a slotted upright upon the other side, and has attached a strong cord F, that passes through an eye G, and extends to a position near the coupling-heads H. The piston D has a small vent-opening $f$ through it immediately above the port $e'$, and the valve-stem $d^2$ has a groove $g$ in its stem, which, in a certain position, allows a leakage of air to escape through the upper head of the valve-casing. Now, when the uncoupling of the heads H H is to be effected, the pipes A and B must be shut off from the flexible sections A' and B', and the air contained in the latter must first be allowed to escape before the coupling-heads can be separated. For this purpose the brakeman seizes a cord F of each valve in each hand, and, applying a tension thereto, effects the following changes in the position of each valve: Lever E is forced down and brings the piston D over port $e$, which shuts off the air between the pipes A and B and their flexible sections. At the same time the outlet $f$ allows the air in the sections A' and B' to escape from $c'$ to the top of the cylinder and thence through the duct $g$ to the outer air. The heads H H can now be easily uncoupled, tension still being maintained, however, on the cords. Where the cars are to be detached, blind-couplings H' H', which are in the nature of terminal plugs, are then taken from points of convenient suspension close by on the car and are fitted to the heads H of the coupling, so that air cannot escape from the pipes A and B. To couple again, the cords F are drawn tight again and the terminal blind-couplings H' being removed the heads H H are connected together. The tension on cords F being then removed, the pressure of air through ports $e$ forces up pistons D, closes the vent $f$ by forcing it against a washer $h$, and the air then passes from the locomotive through pipe A to valve-chamber $c$, through port $e$, down $e'$ to chamber $c'$, thence through the flexible pipes A' and B' and through the other valve, on throughout the train of cars. With this construction it will be seen that after the act of coupling the pipes is effected the valves automatically open up air communication through the pipes, so that by no means can the pipes be left in an obstructed or inoperative condition.

Having thus described my invention, what I claim as new is—

1. The combination, with the pipes A and B and their flexible sections A' B' with coupling-heads H H, of automatically opening valves placed between the pipes A B and their flexible sections and blind-couplings H' H', substantially as shown and described.

2. The valve C, consisting of an outer casing with a single chamber above and two chambers below opening above into the single chamber, a piston arranged to fit within the upper chamber and cover both the openings of the lower chambers, and means for operating the same, substantially as shown and described.

3. The valve C, consisting of an outer casing with a single chamber above and two chambers below, a piston having vent $f$, and piston-rod having groove $g$ for a leakage of air through one of the chambers $c'$ while the other one is closed, substantially as shown and described.

4. The valve C, consisting of an outer case with a single chamber above and two below opening into the one above, a piston D with vent $f$, and piston-rod having groove $g$, the soft washer or packing-ring $h$, the lever E, cord F, and guide-eye G, substantially as shown and described.

LEWIS S. RIGGS.

Witnesses:
EDWD. W. BYRN,
SOLON C. KEMON.